(No Model.)
J. KAVANAGH.
APPARATUS FOR PLANING ICE CAKES.
No. 428,565. Patented May 20, 1890.
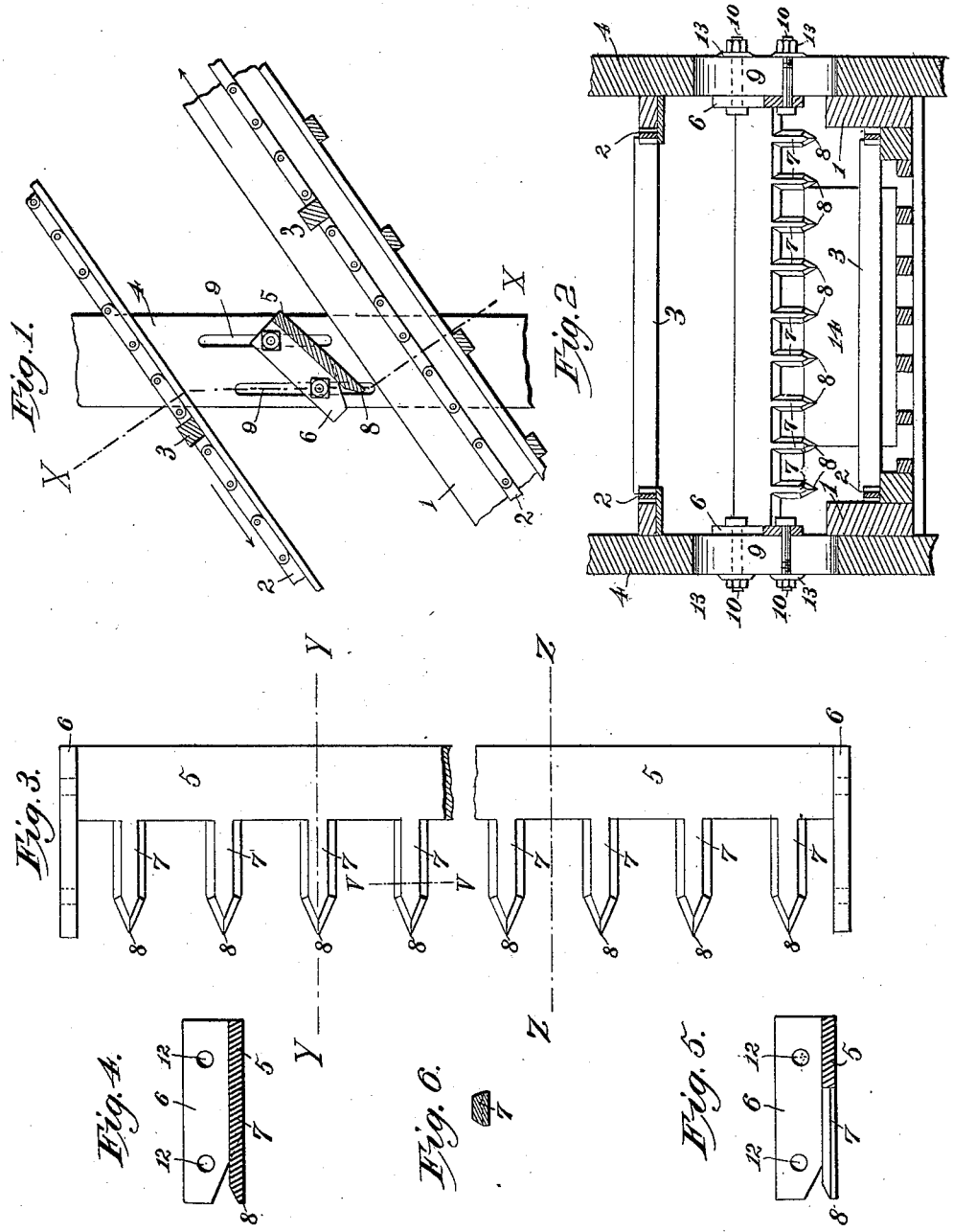

UNITED STATES PATENT OFFICE.

JEREMIAH KAVANAGH, OF WENHAM, MASSACHUSETTS.

APPARATUS FOR PLANING ICE-CAKES.

SPECIFICATION forming part of Letters Patent No. 428,565, dated May 20, 1890.

Application filed October 12, 1889. Serial No. 326,894. (No model.)

*To all whom it may concern:*

Be it known that I, JEREMIAH KAVANAGH, a citizen of the United States, and a resident of Wenham, in the county of Essex and State of Massachusetts, have invented new and useful Improvements in Apparatus for Planing Ice-Cakes, of which the following, taken in connection with the accompanying drawings, is a specification.

This invention relates to improvements in apparatus for planing ice-cakes while they are being conveyed on the elevator from the lake or river to the ice-house or storing-place, and it is carried out as follows, reference being had to the accompanying drawings, wherein—

Figure 1 represents a longitudinal section of an ice-elevator provided with my improvements, and Fig. 2 represents a cross-section on the irregular line X X shown in Fig. 1. Fig. 3 represents a top or plan view of the adjustable toothed head or ice-planing tool. Figs. 4 and 5 represent cross-sections, respectively, on the lines Y Y and Z Z in Fig. 3; and Fig. 6 represents a cross-section of one of the cutter-teeth on the line V V shown in Fig. 3.

Similar letters refer to similar parts wherever they occur on the different parts of the drawings.

1 represents an inclined railway of the kind usually employed for raising ice-cakes, a small portion of such railway only being shown.

2 is the endless chain, as usual provided with cross-bars 3 for moving the ice-cakes upward on the railway. The said endless chain 2 is moved in the direction shown by arrows in Fig. 1 by means of a steam-engine or other suitable motive power applied to one of the drums on which the chain 2 is carried, as is common in apparatus of this kind.

To the outside of the railway 1, or to any other suitable stationary object, are secured in a suitable manner the upright posts 4 4, one on each side of said railway, and to said posts is secured in an adjustable manner the cutter-head, which is made of metal, preferably cast-steel, and composed of a bar or plate 5, having flanges 6 6 in its ends, as shown. In one piece with the said bar 5 are cast a series of pointed cutter-teeth 7 7 7, which latter are smooth and straight on their under sides, as shown in Figs. 1, 4, and 5, and have diamond-shaped cutting-points 8 8 in their forward ends. Such cutting edges or points are made tapering toward the upper sides of said cutter-teeth, as shown in the drawings. By so constructing the cutter-head, as shown and described, great strength, rigidity, and durability are obtained and the points of the teeth rendered more effective in reducing the ice-cakes to the desired and uniform thickness when said ice-cakes during their upward motion on the elevator are brought in contact with the diamond-pointed teeth.

For the purpose of adjusting the cutter-head up and down, according to the thickness of the ice that is being stored, I make through each of the posts 4 a pair of vertical and parallel slotted perforations 9 9, and I make in each of the cutter-head flanges 6 6 a pair of perforations 12 12, as shown.

10 10 are screw-bolts passing through the perforations in the flanges 6 6 as well as through the slotted perforations 9 9, as shown in Figs. 1 and 2, such screw-bolts having heads in one of their ends and provided with adjustable fastening-nuts 13 13 in their other ends, as shown in Fig. 2. By means of said screw-bolts and the slotted perforations 9 9 in the posts 4 4 it will readily be seen that the cutter-head may be vertically adjustable relative to the thickness of the ice that is being stored, and after said cutter-head has been adjusted it can be firmly secured to the posts 4 4 by means of the nuts 13 13.

By making the slots 9 9 a little wider than the thickness of the fastening-bolts 10 10 the cutter-head may be slightly oscillated for the purpose of setting and securing it in place with a proper and desired inclination relative to the elevator.

14 in Fig. 2 represents one of the ice-cakes that is being carried on the elevator against the teeth on the cutter-head for the purpose mentioned.

Having thus fully described the nature, construction, and operation of my invention, I wish to secure by Letters Patent and claim—

In combination with an ice-elevator and its endless carrying-chain, the stationary posts 4 4, having the slots 9 9, and the cutter-head having the cutter-teeth 7 8, flanges 6 6, and adjustable fastening-bolts 10 13, substantially as and for the purpose set forth.

In testimony whereof I have signed my name to this specification, in the presence of two subscribing witnesses, on this 18th day of October, A. D. 1888.

JEREMIAH KAVANAGH.

Witnesses:
 ALBAN ANDRÉN,
 SELMA R. SCHELIN.